United States Patent [19]

Leatherman

[11] Patent Number: 5,129,977
[45] Date of Patent: Jul. 14, 1992

[54] METHOD OF CURING THERMOSET BONDING AGENT FOR NON-DISTORTION SELF-SUPPORTING THERMOSET COMPONENT PARTS

[75] Inventor: Alfred F. Leatherman, Columbus, Ohio

[73] Assignee: William C. Heller, Jr., Milwaukee, Wis.

[21] Appl. No.: 635,406

[22] Filed: Dec. 31, 1990

Related U.S. Application Data

[63] Continuation of Ser. No. 632,459, Jul. 19, 1984, abandoned.

[51] Int. Cl.$^5$ .............................. B32B 31/00; C09J 4/00
[52] U.S. Cl. .................... 156/272.4; 156/273.7; 156/275.5; 156/275.7; 156/330; 156/331.7; 219/10.53
[58] Field of Search .............. 156/272.4, 273.7, 275.1, 156/275.5, 275.7, 64, 359, 309.6, 306.6, 272.4, 272.2, 311, 330, 331.7; 219/10.53

[56] References Cited

U.S. PATENT DOCUMENTS

| | | | |
|---|---|---|---|
| 2,393,541 | 1/1946 | Kohler | 156/272.4 X |
| 3,222,234 | 12/1965 | DeJean et al. | 156/275.5 |
| 3,367,808 | 2/1968 | Edwards | 156/272.4 |
| 4,175,283 | 11/1979 | Buchwald et al. | 364/117 |

OTHER PUBLICATIONS

Readdy, Jr., A. F., "Plastics Fabrication by Ultraviolet, Infrared, Induction, Dielectric, and Microwave Radiation Methods", Plastics Evaluation Test Center, Picatinny Arsenal, Dover, N.J., Apr. 1972, pp. 80-83.

Primary Examiner—David A. Simmons
Assistant Examiner—Chester T. Barry
Attorney, Agent, or Firm—Andrus, Sceales, Starke & Sawall

[57] ABSTRACT

A method of bonding areas of two elements of a sheet molded compound to form a bonded product includes intimate mixing of a thermoset epoxy or polyurethane adhesive with submicron particles selected from the group of gamma $Fe_2O_3$ and magnetic iron oxide $Fe_3O_4$, with the particles typically being 5 to 40% by weight of the final adhesive mixture to form a semi-liquid adhesive mixture. A bead of the adhesive mixture is located between the elements to be joined, and the elements are forced toward each other to compress and spread the semi-liquid adhesive mixture to form a flattened bonding element in intimate contact with the surfaces to be joined with an accurately controlled typical thickness of the adhesive of 0.005 inches to 0.2 inches. An induction coil is coupled to the elements and energized with a high frequency current of a frequency of from 1.5 to 8 MHz for a total period of about thirty seconds. The current level and time is controlled to first rapidly heat the adhesive without significant heating of the elements, and after the cure temperature is reached to reduce the power input and hold an optimum heat level for a sufficient time to create a gel condition. The bonded product is then transferred for further working.

10 Claims, 1 Drawing Sheet

METHOD OF CURING THERMOSET BONDING AGENT FOR NON-DISTORTION SELF-SUPPORTING THERMOSET COMPONENT PARTS

This application is a continuation of Ser. No. 06/632,459, filed Jul. 19, 1984.

BACKGROUND OF THE INVENTION

This invention relates to a thermoset bonding agent for non-distortion joining of self-supporting thermoset component parts.

Rigid component parts of a thermoset plastic resin may be joined by different means including mechanical connections, and/or chemical bonds using various adhesive and bonding agents. A fiberglass material of a known thermoset plastic resin mixed with fiberglass forms a high strength sheet element. Such material and elements are useful as a replacement for metal components because complex parts can be conveniently formed and shaped with a highly finished surface. Fiberglass reinforced components may be formed which are lighter than comparable metal parts, and are not of course subject to the usual corrosion which is so destructive of metal parts in motor vehicles or the like. The complex parts also reduce the number of parts required and may result in significantly less total tooling costs.

The parts must of course be joined with a long-life and high strength connection. In the fabrication of metal parts, sophisticated and excellent joining methods such as the various forms of welding have been highly developed and provide rapid, low cost production of metal parts. Plastic components have generally presented more difficult, or expensive joining problems.

Various products are now made of a special glass reinforced epoxy or other thermoset resin, which is identified as an SMC product, from the sheet-molding-compound material of which it is formed. In such products, one method of bonding is a thin epoxy adhesive of the two part type. Conventionally, the epoxy adhesive includes an epoxy resin and a curing agent which cures the adhesive and which is known to be temperature dependent. To accelerate the curing reaction, the assembly may be coupled to a heating unit under pressure. The heat is typically applied, in commercial practice, for a period such as six minutes to heat the elements and transfer the heat to the adhesive and thereby generate a partially bonded assembly.

In particular, the adhesive bonding is widely used in automotive and marine products for joining of the fiberglass and similar parts. In the prior art bonding methods one or more beads of adhesive are applied to a first sheet molded compound member and the second member applied thereon. The members are clamped between a heated platen and a pressure plate means, which serves to flatten the adhesive so as to cover the intended bond or joint surfaces. The pressure pad may be applied after the curing has begun and is normally held until a "gel" condition has been established.

The pressure pad is applied so as to spread the adhesive to establish a selected thickness of adhesive. The heating system heats the component parts which transmitts the heat to the adhesive to increase the curing rate of the adhesive. Various adhesives such as an epoxy or a polyurethane are used in such joining processes in both the automotive and the marine industries. Generally, the adhesive is a two component mixture, one of which activates a curing reaction in the mixture to cure to a solid adhesive mass firmly bonded to the adjoining elements. Although the adhesive will generally cure at room temperature, the time required is generally on the order of two or more hours which is generally prohibitively long for commercial implementation in mass production, such as in marine and vehicle production systems. Accelerated curing is therefore uniformly created by heating of the elements to raise the temperature of the elements and the adhesive, while holding of the parts under pressure to establish and hold the adhesive layer equal typically to 0.03 inches.

The assembly is heated for a sufficient period to increase the temperature until a "gel" condition is reached, which the inventor has found is typically a state in which the adhesive joint has a strength of 100 PSI (per square inch). The "gel" condition is more generally defined as that partially cured state which is sufficient to permit subsequent handling of and processing of the assembly in the production system. In one application, a "cure" time of at least six minutes is required to create a "gel" condition, or bond strength of 100 PSI. The hot elements of course contribute to further curing during such subsequent processing.

Such prior art bonding methods generally require the relatively long processing time of six minutes or more because of the heat transfer characteristic of the element. Further, the heat in the elements tends to spread from the bond area into the adjacent portions which involves heating of substantially greater mass than necessary for the adhesive curing. Further, heating of the adjacent portions is known to increase the temperature to a distortion related level at which the physical characteristic of the element may be adversely affected and physical distortion may occur directly or during subsequent handling.

The present inventor has been involved in an improved thermoset curing system, such as disclosed in U.S. Pat. Nos., 3,461,014 which issued Aug. 12, 1969 and 3,730,806 which issued May 1, 1973 wherein the adhesive is mixed with a heat generating particulate for a more rapid and improved heating characteristic. The disclosed embodiment therein is particularly related to a non-rigid element such as the binding of books. Although such system may be used to advantage, the inventor has found several factors are critical to bond self-supporting and generally rigid elements of a sheet-molded-compound material and particularly to provide practical implementation of an accelerated curing process in commercial-type production of such rigid plastic elements using a thermoset adhesive.

SUMMARY OF THE PRESENT INVENTION

The present invention is particularly directed to an improved bonding method and bond structure including a thermoset adhesive joining rigid thermoset plastic elements, and particularly such fiberglass reinforced thermoset plastic elements, over an extended bonding area or surface, and more particularly elements of a fiberglass reinforced sheet-molded-compound (SMC). The SMC element may be molded or shaped into a complex form and joined to create relatively complex parts or components. Although the sheet element may only have a thickness of 0.1 inch, the sheet is a relatively rigid self-supporting structure, which can be shaped to form a self-supporting non-planar part such as an automobile engine hood, rear deck lid and the like. Generally, in accordance with the teaching of the present invention, a thermoset adhesive in a liquid or semi-liquid state is thoroughly mixed with particles or otherwise treated to create heat in the presence of an energy field which can be coupled to the adhesive without significant coupling to the elements to be joined. The added particles form a total percentage by weight of the thermoset adhesive mixture sufficient to provide a desired rapid heating of the thermoset adhesive mixture without adverse heating of the element. The heating of only a limited mass of the elements being bonded maintains the integrity of the elements without cooling upon termination of the forced curing and permits continued processing of the bonded component. The thermoset adhesive mixture is also selected to maintain a minimum thickness of the adhesive for producing of an appropriate bonded connection of the sheet molded elements.

The thermoset adhesive material in an optimum product is mixed with submicron heating particles selected from the group consisting of gamma $Fe_2O_3$ and magnetic $Fe_3O_4$ and in an amount of typically five percent to fifty percent by weight of the final adhesive-particle mixture, with the percentage by weight that is needed being inversely related to the thickness of the adhesive to be used. Such mixture permits the adequate generation of curing heat without significant heating of the mass of the rigid elements and particularly holds the heat history of the rigid elements below the distortion related level, although various special procedures may permit exceeding such range.

In a preferred method and structure, the adhesive mixture is formed by thoroughly mixing the particles with a semi-liquid adhesive to the desired proportion. A bead of the adhesive is interposed between the two elements and pressure applied across the assembly to squeeze and spread the adhesive over the area to be bonded, while maintaining a thickness of the adhesive related to the particle mass. Thus, the semi-liquid adhesive is a generally slippery material and care is required to establish a force on the assembly which maintains the proper thickness of the adhesive mixture. Generally, a minimum thickness of about 0.020 inches is necessary for proper mass production techniques. A substantially greater thickness may be used but any thickness in excess of 0.200 inches would reduce the cost effectiveness. The assembly is placed within an induction coil means. A high frequency source supplies a high frequency current to the coil means. The high frequency current is preferably in the range of 1.5 to 8 MHz (megahertz) depending upon the particulars of the assembly, such as desired rate of heat generation, distance between the segments, adhesive thickness of the adhesive layer, concentration of particulate present in the adhesive, frequency of the current, shape of the segments, and the time required to achieve the desired cure.

In a preferred system, the high frequency supply includes an energy level control to permit the controlled timed generation of heat so as to produce an optimum heat history for connecting the elements without distortion of the elements. Thus, generally the adhesive temperature can be increased very rapidly, after which a reduced heat input holds the temperature for proper and rapid curing to the "gel" condition. The total process can be completely within a period as short as or less than thirty seconds, or at a production time generally eight times as fast as conventional procedures now used to join fiberglass SMC elements with a thermoset adhesive. Further, the lateral heat movement in the elements is significantly eliminated by proper operation of the supply and thus only a small proportion rather than the total mass of the elements in and adjacent the bond area experiences the cure temperature. This is significant in reducing the time between initiating the bond and creating a bond state which permits subsequent processing without distortion of the elements. Although the several factors in the assembly will affect the time and temperature sequences, an appropriate and acceptable sequence can be readily determined based on an appropriate combination. In any event, with the present invention, the bonded parts may be promptly removed upon creation of the gel condition, and any excess adhesive removed if necessary or desired. The partially cured product may directly be transferred into the next finishing step and an essentially continuous production line procedure used with the rapid curing produced by the present invention.

DESCRIPTION OF THE DRAWING FIGURES

The drawing furnished herewith illustrates a preferred construction of the present invention in which the above advantages and features are clearly disclosed as well as others which will be readily understood from the following description.

DESCRIPTION OF THE ILLUSTRATED EMBODIMENT

The present invention is particularly directed to joining of fiberglass elements and similar sheet-molded-compound elements which includes a thermoset plastic resin with fiberglass reinforcing to form essentially rigid and self-supporting elements. The elements may be formed as thin sheet members having some overall flexibility but are to be distinguished from the thin highly flexible materials such as polyethylene film and the like. In many instances, the sheet-molded-compound element may have a substantial thickness and form a heavy component or part such as where the element is molded to form an exterior part of an automobile shell, such as the engine hood, a rear lid, a roof or other similar sheet component. In these and other uses, the element is often connected to another similar element. One convenient method involves the adhesive bonding of the elements by interposing a liquid or semi-liquid adhesive and drying or curing thereof to form a bonded connection.

Figure 1:
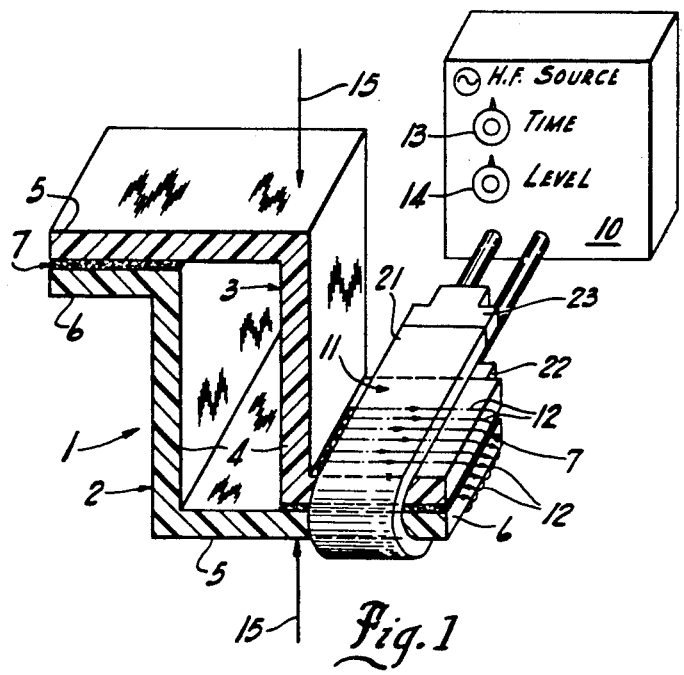
FIG. 1 is a pictorial view of a beam being constructed with the present invention.
Figure 2:
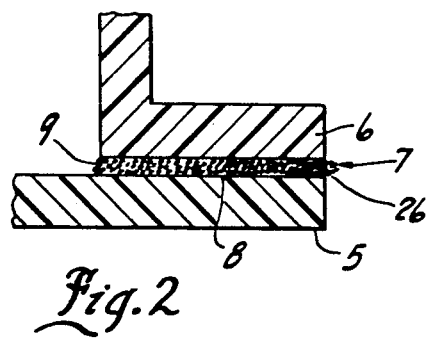
FIG. 2 is a view illustrating a thermoset adhesive joint in the completed beam structure.

In FIG. 1, a box beam 1 is shown which may be used to form a structural component in a vehicle or other device. The beam 1 includes a pair of complementing Z-shaped members 2 and 3 formed of sheet molded compound material such as a fiberglass reinforced epoxy plastic. The members 2 and 3 include similar parallel, spaced legs 4, forming opposite sides of the box beam 1. The second opposite sides of box beam 1 are formed by similar legs 5 of each beam member. The legs 5 span the spacement between the legs 4 and extend beyond the spaced leg in overlapping relationship to the end leg 6 of opposite members 2 or 3. The legs 6 are relatively short and define a bonding area over which the opposed legs 5 and 6 are to be joined by a thermoset adhesive mixture 7. The thickness of beam members 2 and 3 may typically be 0.1 inch and the beam 1 have a cross-section of six inches by six inches. The adhesive mixture 7 is specially formulated to include a thermoset adhesive 8 having a dispersion of heat generating particles 9 through the mixture 7. The particles 9 are selected to respond to an energy field in the space of the overlapping beam legs 5 and 6 and thus the adhesive mixture 7 to generate heat directly within the adhesive. An energy source 10 is shown connected to a field generating coil unit 11 encircling one of the over-lapping legs 5 and 6.

Energizing of the coil unit 11 creates an energy field 12 operable to activate the particles 9 to generate heat within the adhesive mixture 7 and thereby cure or dry the adhesive to produce a firm adhesive bond to the element legs 5 and 6. The opposite set of legs 5 and 6 may be simultaneously acted upon by a similar coil field. During the bonding cycle, the contact area of the legs 5 and 6 must be in intimate contact with the adhesive mixture and without air pockets within the adhesive or interface, and a pressurized holding device 15 is coupled to members 2 and 3 to hold them in precise spaced relation and with the adhesive 7 in intimate contact with the legs. Thus, in operation, the beam members 2 and 3 are assembled with the interposed adhesive mixture 7 compressed to a selected thickness. The coil unit 11 is placed over the overlapping legs 5 and 6 and energized to generate heat within the adhesive. The time and level controls 13–14 are selected to produce a rapid heating of the adhesive 7 to the curing temperature and then reduced to produce a holding level energization to maintain the curing temperature while minimizing the heating of the elements 5 and 6. Thus, the adhesive is dried or cured to form a firm adhesive bond to the adjoining legs 5 and 6 throughout the interface 8 with the adhesive mixture.

More particularly, the heat pattern is selected to rapidly increase the temperature of the bonding element with minimal heating of the adjacent mass of the SMC elements. Thereafter, heat input is reduced to maintain a cure temperature without creating excess heating which can transfer to the mass of the SMC elements. Thus, once the cure temperature is reached, the excitation can be changed as a step function to a significantly lower level. The decreased excitation may be held constant, or a special patterned heating created such as a gradual reduction in the excitation. Thus, the heat-absorbing ability of the substrates or SMC elements will be greater at the initiation of the reduced holding temperature than at the time of "gel" condition because of the increase in the average temperature of the substrate mass with time. As a result, optimization of the cure efficiency should result from use of declining rate of excitation in the low heat period. The temperature may of course be progressively reduced with time, changed in selected small steps to generally follow a gradual reduction or otherwise reduced with time. Thus, although shown hereinafter with a linear declining rate of excitation, a curved function may be desirable. Such detail can be readily selected by simple testing of the procedures and may of course vary with the specific substrates and bonding adhesives used.

The adhesive mixture 7 is a mixture of a suitable thermoset material, which is typically an epoxy or polyurethane material, and a resinous reaction material which creates a curing reaction and curing of the thermoset material. Although any suitable thermoset adhesive may be used, commercially available adhesives which have been used to produce firm bonds, include a polyurethane adhesive sold by the Ashland Chemical Company and an epoxy adhesive sold by Lord Corporation.

The heat generating particles 9 are preferably submicron particles selected from the group of magnetic iron oxide powders including gamma $Fe_2O_3$ and magnetic $Fe_3O_4$. Such particles, as disclosed in the prior patents of the inventor, generate heat in the presence of a high frequency electromagnetic field as a result of hysteresis losses. The quantity of particles 9 in the mixture 7 may typically vary from about five percent to fifty percent by weight of the adhesive mixture 7. Although higher loadings may be used to increase the heating rate and therefore the efficiency of the cycle, such heavy loading may well have an adverse effect on the holding capability of the adhesive and limit such usage. Generally, the cure time varies linearly with the loading and a loading approaching maximum particle loading is preferred. The maximum loading is defined herein as that loading which results in an adverse impairment in the quality of the bond between the two elements.

Figure 3:
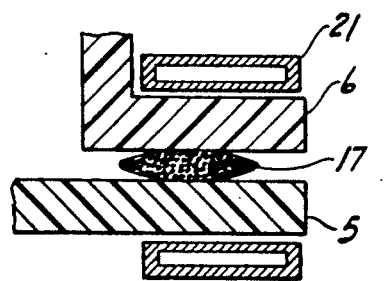
FIG. 3 is an enlarged cross-sectional fragmentary view of FIG. 1 similar to FIG. 2 showing a detail of the beam in the process of formation.
Figure 4:
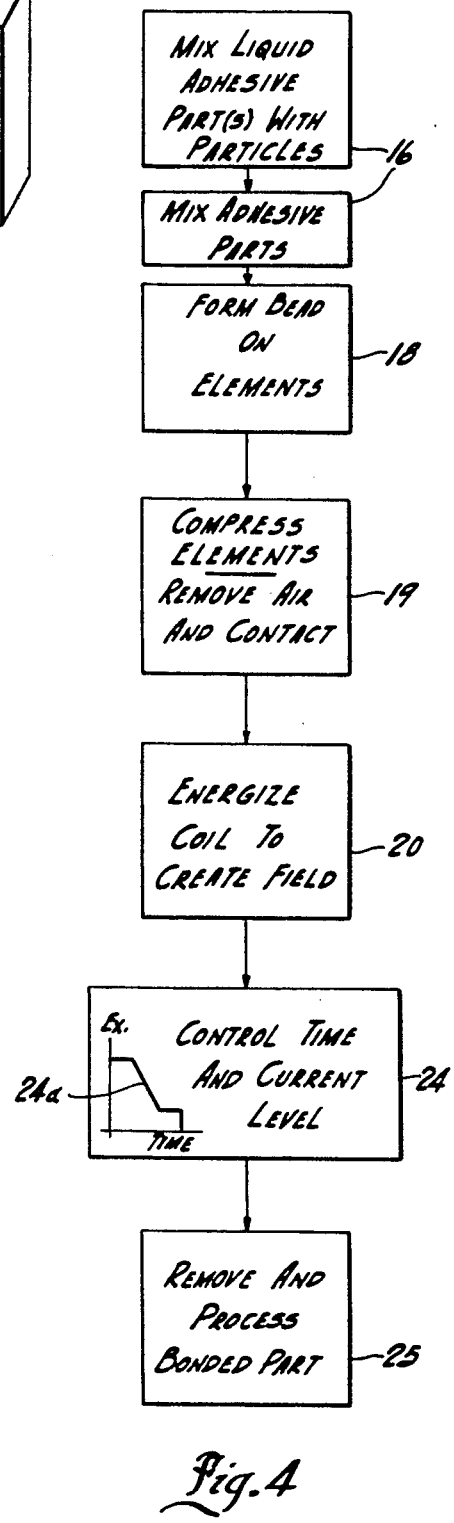
FIG. 4 is a flow chart of the method steps.

The particles 9 are thoroughly mixed with one or more of the separate parts of the adhesive to disperse the particles substantially uniformly throughout the part as shown at 16 in the flow diagram of FIG. 4. The adhesive parts are then mixed in the proper ratio and the mixed adhesive 7 is then formed into a bead 17, such as shown in FIG. 3, as by an extrusion or other process, as shown as step 18 in FIG. 4. The bead 17 is located between the legs 5 and 6 to be joined, and may have an egg-shaped cross-section of a depth greater than the final spacing of legs 5 and 6. The legs 5 and 6 are forced together by the clamp unit 15 to flatten the bead 17 and cause the bead to spread laterally over the interface and fully cover the intended bond area, as by step 19 in FIG. 4. This forced flattening of the bead also assists in eliminating any air pockets within the bond area to ensure a firm interconnection of the adhesive throughout the interface area. The amount of force applied is carefully controlled to ensure accurate positioning of the beam member and particularly to maintain proper spacing and therefore adequate thickness of the particle-laden adhesive. The force control is particularly significant in view of the particle loading and semi-liquid state of the adhesive during the initial activating of the particles, and curing of the adhesive. The ready movement of the slippery adhesive mixture 7, in contrast to a solid bonding element such as in the previously referred to U.S. Pat. No. 3,461,014, requires this control of the force levels therein. Thus, the thickness of the adhesive as well as the loading factor controls the heat generated within the adhesive, and therefore an adequate thickness is critical to obtaining the proper heat history to establish the desired processing time. Thus, excessive force on the member could force practically all of the adhesive mixture from the interface, and prevent any effective bonding. With the appropriate spacing of the members and thickness of the adhesive mixture, the coil unit 11 is energized to create the field 12, as set forth at 20 in FIG. 4.

The coil unit 11 may be of any suitable construction, and is shown as a simple hairpin coil of water-cooled copper or the like and having opposite legs or segments 21 and 22 with an integral curved end connection. The segments 21 and 22 are tubular members having a rectangular cross-section and are of length to encompass the length of the bond area. The width is slightly smaller than the width of the bond area, but the field 12 which is created encompasses the total bond area and particularly the adhesive mixture 7. The free ends 23 of the coil segments 21 and 22 are shaped for connection to the power supply unit 10 which establishes an appropriate high frequency current supply through the coil as well as a flow of cooling water. Maximum coupling and effectiveness is obtained by close placement of the coil segments 21 and 22 to the legs 5 and 6, and the coil segments preferably are in contact with the exterior surfaces. The high frequency current supply 10 may be any suitable construction, and are commercially available. The supply 10 may be of any proper design and generally may be selected to operate within a wide range including 0.3 to 5000 MHz to provide bonding. However, the frequency of the supply for practical application in the embodiment described includes a much more narrow frequency range of 1.5 to 8 MHz. The level of the current will vary with the frequency and various other factors within the final heating assembly. Such factors will include (1) the desired rate of heat generation within the adhesive, (2) the spacing of the coil segments 21 and 22 from the adhesive mixture 7, (3) the thickness of the adhesive mixture 7, (4) the particle loading factor of mixture 7, (5) the coil segment shape and (6) the time allotted to reach the gel state. Generally, the current level will be on the order of 250 amperes and preferably in a range of 250 to 450 amperes, but may be as low as 100 amperes and as high as 650 amperes depending on the particular heating assembly.

As noted, at step 24 in FIG. 4, the time and current level are controllable and permit programming of the temperature generated and therefore the heat history within the adhesive and the components during the curing to the gel condition. For example, the adhesive mixture 7 may be raised to the cure temperature within a period of a few seconds. Thus, a polyurethane adhesive has a recommended curing temperature of about 200° F., while an apoxy adhesive has a recommended curing temperature of about 325° F. After a short, rapid energizing of the particles 9, the current level can be significantly reduced to a fixed level or with a gradual reduction in the excitation to a low level; for example, as shown by the graphical excitation versus time illustration 24a in FIG. 4. The low temperature cycle is selected to hold the adhesive at such cure temperature for a period sufficient for the accelerated curing reaction to establish the gel condition. The total excitation and heating period with the present invention may typically be on the order of only 30 seconds or less. This time period is a dramatic reduction in the curing time of existing practice, on the order of eight times faster, and in sharp contrast to the usual commercial heating sequence of six minutes or more which has been used in standard practice in present day joining of SMC elements.

Even more significant is the highly improved heat history of the assembly in the present invention, and particularly with the respect to sheet-molded-compound elements aligned with the mixture 7 but also the adjoining portions of such elements. Thus, the adhesive mixture 7 may be rapidly brought to the curing temperature during which period there is essentially no heating of the substrates or elements 5 or 6 other than in the immediate surface abutting the adhesive mixture. Further, the adhesive is then directly held at the curing temperature, and then for the relatively short cycle time such as thirty seconds. The absence of heat generation in the elements 5 or 6 in combination with the exceedingly short heat cycle minimizes the probability of significant heating of the mass of elements, and the method may be arranged and constructed to result in a reduction to less than half of the mass of elements being subjected to the cure temperature. However, the total heat cycle may be generally affected by the inherent conduction of heat from the activated bonding element to the substrate. This may be of more significance where a relatively thin bonding layer is used, such as the previously mentioned 0.005 inches. In such instance, preheating of the substrate in combination with the heat concentration in the bonding layer, may permit use of even thinner layers and/or somewhat reduced cycle time. Simple investigation of the time and temperature levels can readily provide the optimum conditions for any given applications.

Finally, as shown at 25 in FIG. 4, after creation of the gel condition, the bonded component beam 1 is removed and sent directly to the next work or process station in the production line. The compression of the elements 5 and 6 may squeeze excess adhesive mixture 7 from the bond area, as at 26. Such excess adhesive mixture 26 can be readily removed immediately after removal from the curing apparatus. The maintained integrity of the beam 1 or other product permits the beam to be directly finished or assembled with other components and thereby increase the efficiency and cost effectiveness of the production process.

The present invention has been particularly described using heat generating particles which are particularly adapted to the activation of the thermoset adhesive mixture. However, other generally similar systems might be used within the broadest aspects of the invention. Thus, other magnetic materials, such as iron and iron alloys and even cobalt and nickel alloys, might be useful. Even non-magnetic particles such as copper may be useful where a particle size is not a particular limiting factor. Dielectric heating might be used with particles of polyvinylchloride, polyvinylidene chloride or even polyurethane. Where the elements are transparent, the adhesive may even be activated with laser energy. A black pigment in the adhesive would increase the effectiveness of a laser source. Even sonic energy might be applied to the adhesive, particularly where solid elements are being joined.

The present invention is directed to and in fact provides a rapid economical adhesive bonding and with essentially no deleterious effect on the elements to produce a strong, reliable bonded connection of elements formed of a thermoset type plastic resin using a thermoset adhesive.

Various modes in carrying out the invention are contemplated as being within the scope of the following claims, particularly pointing out and distinctly claiming the subject matter which is regarded as the invention.

I claim:

1. A thermal bonding method for joining of thin, rigid plastic elements subject to further subsequent working and subject to distortion in the presence of a minimum distortion related temperature at which the mass is distorted under said subsequent working, comprising:

mixing particles of a submicron size with an uncured thermosetting adhesive having an activating temperature to establish a gel state adapted to bond to said elements, said particles being selected to generate heat in the presence of a selected energy field, applying said adhesive mixture between the elements to be bonded to form an intimate engaging coating to the elements, applying a compression force across said elements to maintain a minimum adhesive filled space and eliminate air pockets within the bond area and adhesive, generating a controllable energy field in the adhesive to activate said particles and generate heat within the adhesive, continuously controlling the level of said energy field until the adhesive has reached the gel state and creating a heat history including a first generation of said energy field to produce a first heating of said adhesive at a relatively high heat rate over a first time period to rapidly heat the adhesive to a temperature in excess of the level to create a gel state and thereafter changing the generation of said energy field to produce a second positive heating of said adhesive at a significantly lower heat rate than said first heat rate over at least one second time period and thereby heating said adhesive, both said first and said second heating including the activating of said particles to produce a positive heat input within said adhesive during both said first and second time period for a total time period not substantially greater than thirty seconds and for direct heat transfer tot he adhesive to hold the adhesive at an elevated temperature significantly above the temperature of the plastic elements and at a temperature to rapidly establish said gel state of said adhesive and thereby minimize heating of the substrates above the level created by the first heat rate while producing a rapid gellation of the adhesive, and terminating said heating upon establishing said gel state of said adhesive.

2. The method of claim 1 wherein said particles are selected from the group of gamma $Fe_2O_3$ and magnetic $Fe_3O_4$, and in the range of five to fifty percent by weight of a final adhesive mixture to maintain the integrity of the cured adhesive.

3. The method of claim 1 wherein said energy field is held essentially constant during said first high heating period and controlling a successive change in said energy field during said second heat rate period and with a controlled positive heating of said particles for heating of said adhesive by successive reduction of said second heat rate.

4. The method of claim 3 wherein said heat rate in said second period is reduced with a continuous reduction in the level of said energy field and thereby in the heat rate.

5. The method of claim 4 wherein said continuous reduction is linear.

6. The method of claim 4 wherein said continuous reduction is non-linear.

7. A thermal adhesive bonding method, directed toward minimizing of processing time and control of distortion, for joining of thermoset plastic elements subject to further subsequent working and subject to distortion in the presence of minimum distortion related temperature at which the mass is distorted directly or under said subsequent working, comprising:

forming an uncured thermosetting adhesive adapted to bond to said elements and having a cure characteristic with the curing of said adhesive activated by heating and accelerated by heat, said adhesive having integral means responsive to an externally generated energy field to create heat directly within the adhesive, said adhesive being in a flowable state, applying said adhesive mixture between the elements to be bonded in a thickness at least equal to 0.005 inch thick to form an intimate engaging coating to the elements, applying a compression force across said elements to move said adhesive and to maintain the spacing between said elements equal to at least 0.005 inches and less than 0.2 inches and to eliminate air pockets within the bond area and adhesive, generating an energy field of a controllable intensity through the elements and said adhesive for a total period no greater than about 30 seconds to generate heat essentially solely within the adhesive and activate the adhesive, continuously controlling the intensity of said field to maintain said particles activated during said total period and in a timed sequence including a first time period of relatively high field intensity to rapidly raise the temperature of the adhesive to a first elevated level to initiate activation of the adhesive to create a partially gelled condition, and a second time period immediately following said first time period including continuing the field intensity of said energy field and controlling said lower intensity to produce activation of said particles and maintaining a controlled input of heat to the adhesive and thereby an elevated temperature to continue a chemical reaction and creating the gelled state of said adhesive during said second period, and upon creating said gelled state terminating said energy field and removing said compression force from said elements, and thereby creating a minimal processing time no greater than about 30 seconds for adhesively joining the elements for subsequent working without deleterious distortion of the elements, and subjecting said elements to subsequent working.

8. The bonding method of claim 7 wherein said elements are a glass reinforced sheet-molded-compound, and said adhesive is selected from an epoxy resin and a polyurethane resin.

9. The method of claim 7 wherein said particles are dispersed throughout the adhesive layer, said particles defining a plurality of heat centers within the presence of said energy.

10. The method of claim 9 wherein said particles are submicron particles selected from the group of gamma $Fe_2O_3$ and magnetic $Fe_3O_4$.

* * * * *